United States Patent [19]

Goldberg

[11] Patent Number: 5,657,952
[45] Date of Patent: Aug. 19, 1997

[54] ELECTRO-EXPULSIVE DE-ICING APPARATUS AND METHOD OF USE

[75] Inventor: Joshua I. Goldberg, Woodbridge, Conn.

[73] Assignee: Dynamic Controls HS, Inc., Windsor Locks, Conn.

[21] Appl. No.: 509,171

[22] Filed: Jul. 31, 1995

[51] Int. Cl.$^6$ .................................................. B64D 15/12
[52] U.S. Cl. .................................. 244/134 R; 244/134 D
[58] Field of Search ........................................ 244/134 A

[56] References Cited

U.S. PATENT DOCUMENTS

| | | |
|---|---|---|
| 2,393,635 | 1/1946 | Hubbard .............................. 244/134 D |
| 2,439,037 | 4/1948 | Campbell . |
| 3,370,814 | 2/1968 | Kageorge et al. . |
| 3,690,601 | 9/1972 | Roemke . |
| 4,779,823 | 10/1988 | Ely et al. ............................. 244/134 A |
| 4,875,644 | 10/1989 | Adams et al. . |
| 4,894,569 | 1/1990 | Lardiere, Jr. et al. . |
| 4,982,121 | 1/1991 | Lardiere, Jr. et al. . |
| 5,022,612 | 6/1991 | Berson . |
| 5,107,154 | 4/1992 | Goldberg et al. . |
| 5,112,011 | 5/1992 | Weisend, Jr. et al. . |
| 5,129,598 | 7/1992 | Adams et al. . |
| 5,143,325 | 9/1992 | Zieve et al. . |
| 5,152,480 | 10/1992 | Adams et al. . |
| 5,248,116 | 9/1993 | Rauckhorst . |
| 5,272,400 | 12/1993 | Goldberg et al. . |
| 5,310,142 | 5/1994 | Weisend, Jr. . |
| 5,314,145 | 5/1994 | Rauckhorst, III . |

*Primary Examiner*—Galen L. Barefoot
*Attorney, Agent, or Firm*—McCormick, Paulding & Huber

[57] ABSTRACT

A de-icing blanket and method of ice-removal from a moving object such as an airfoil comprises a center portion including a heater, and side portions flanking the center portion, each side portion including an electro-expulsive de-icing system (EEDS). The center portion is placed on the leading edge of the airfoil forwardly with respect to the side longitudinal portions such that when the airfoil is in motion, an airflow impinging on the airfoil forces water contacting an exposed surface of the center portion to flow rearwardly and to freeze on accreting surfaces of the side portions where the ice is subsequently removed by energizing the EEDS. The blanket may include a leading edge cap made of a highly polished impervious material to protect the blanket from atmospheric weathering.

19 Claims, 2 Drawing Sheets

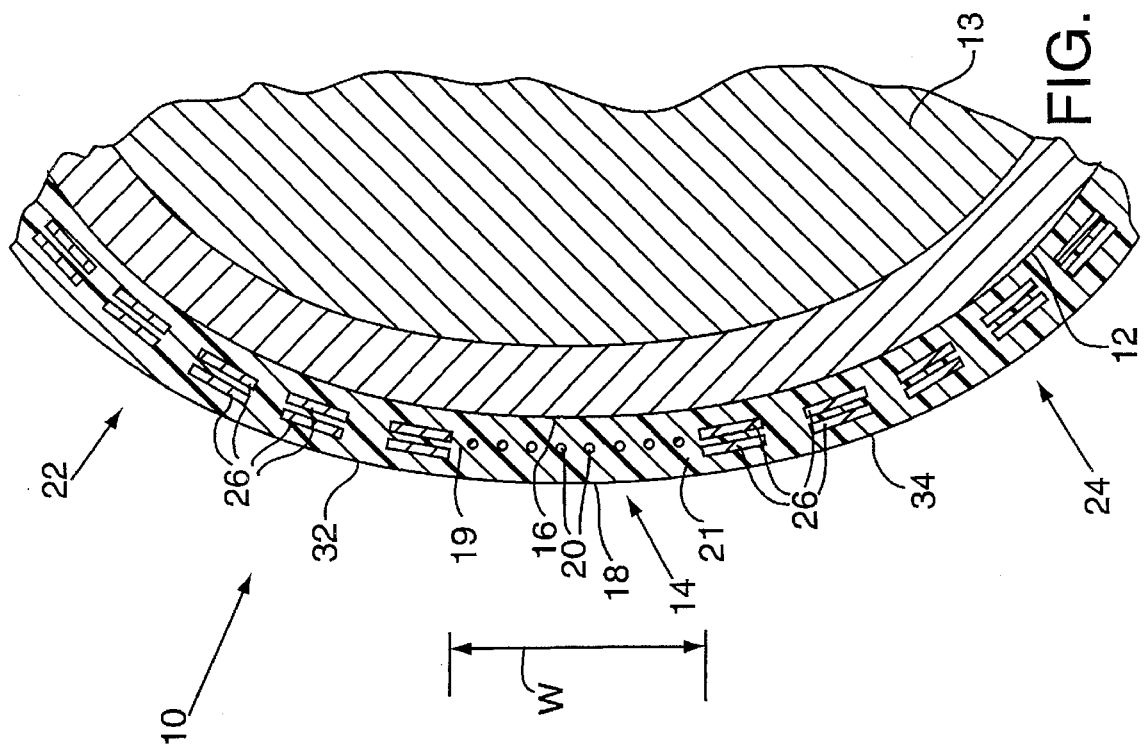
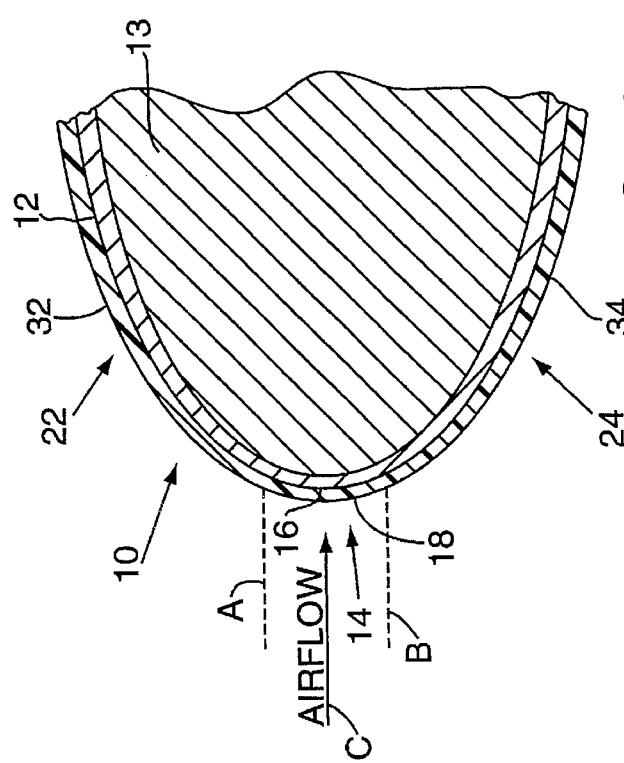

ELECTRO-EXPULSIVE DE-ICING APPARATUS AND METHOD OF USE

FIELD OF THE INVENTION

The present invention relates to a de-icing apparatus for removing ice, and relates more particularly to an electro-expulsive de-icing blanket for removing ice and other fungible material from an accreting surface such as an airfoil.

BACKGROUND

Electro-Expulsive De-icing System (EEDS) apparatuses or blankets are used to shed ice from an aerodynamic surface, such as the leading edge of an airfoil. The airfoil is typically polished to a very smooth finish to obtain good aerodynamic or air-drag efficiency in dry atmospheric conditions. Unfortunately, the smooth finish of the airfoil and the corresponding airfoil air-drag efficiency are reduced when the leading edge of the airfoil is covered with the relatively less smooth elastomeric or like materials comprising EEDS blankets. Furthermore the problems of surface smoothness and air-drag efficiency—especially for smaller and thinner airfoils—are further exacerbated as the surface of the blanket is toughened during flight by the effects of atmospheric weathering such as rain erosion, sand, dust and the like. Moreover, such weathering significantly reduces the operating lifetime of the blanket, thereby contributing to increased maintenance costs.

In view of the foregoing there is a need to provide an EEDS blanket which has a relatively longer operating life and which cooperates with airfoils to reduce air-drag.

SUMMARY OF THE INVENTION

The present invention is directed to a de-icing apparatus for use on moving surfaces such as airfoils and the like. The apparatus comprises a center portion whose length is to extend along the length of the leading edge of a an airfoil at a forwardmost portion with respect to airfoil motion, and whose width is to extend along the leading edge in a direction from the top to the bottom of the airfoil. The width of the center portion terminates at opposed first and second ends. The center portion defines an exposed surface to face outwardly from a mounting surface of the airfoil, and the center portion includes a heater for maintaining the temperature of the exposed surface above the freezing temperature of water. The apparatus also comprises first and second side portions flanking the center portion respectively at the first and second ends, the length of each side portion being substantially coextensive with the length of the center portion, and each of the side portions to be operatively located rearwardly on a mounting surface of the airfoil relative to the center portion. The side portions each comprise an accreting surface to face outwardly from the mounting surface and an electro-expulsive de-icing system (EEDS) supported by the side portion for shattering and removing ice and other like particles from the accreting surface. The heater of the center portion prevents water contacting the exposed surface from freezing thereon such that an airflow impinging on the airfoil when in motion forces the contact water to flow rearwardly from the exposed surface of the center portion to the accreting surfaces of the side portions where the water freezes in order to be shattered and removed from the accreting surfaces by the EEDS of each side portion.

The present invention is also directed to a method of removing ice from an accreting surface of a moving object such as an airfoil. A forwardmost exposed surface of a moving object is heated to maintain the temperature of the exposed surface above the freezing temperature of water for preventing water contacting the exposed surface from freezing thereon. An airflow impinging on the exposed surface forces the contact water to flow rearwardly onto and to freeze on an unheated accreting surface overlying the moving object. The ice freezing on the accreting surface is then removed by suitable means such as an electro-expulsive de-icing system.

One advantage of the present invention is that ice is prevented from building-up on the exposed surface of the blanket thereby increasing its operating life.

Another advantage is that the contact water flows onto an accreting surface and freezes in such a way so as to provide superior shedding efficiency.

Other advantages of the present invention will become apparent in view of the following detailed description and accompanying drawings.

BRIEF DESCRIPTION OF THE DRAWINGS

FIG. 1 is a schematic partial cross-sectional view of a de-icing blanket embodying the present invention, as applied to an airfoil.

FIG. 2 is an enlarged schematic partial cross-sectional view of the blanket of FIG. 1 taken between the lines A and B.

DETAILED DESCRIPTION

Figure 3:
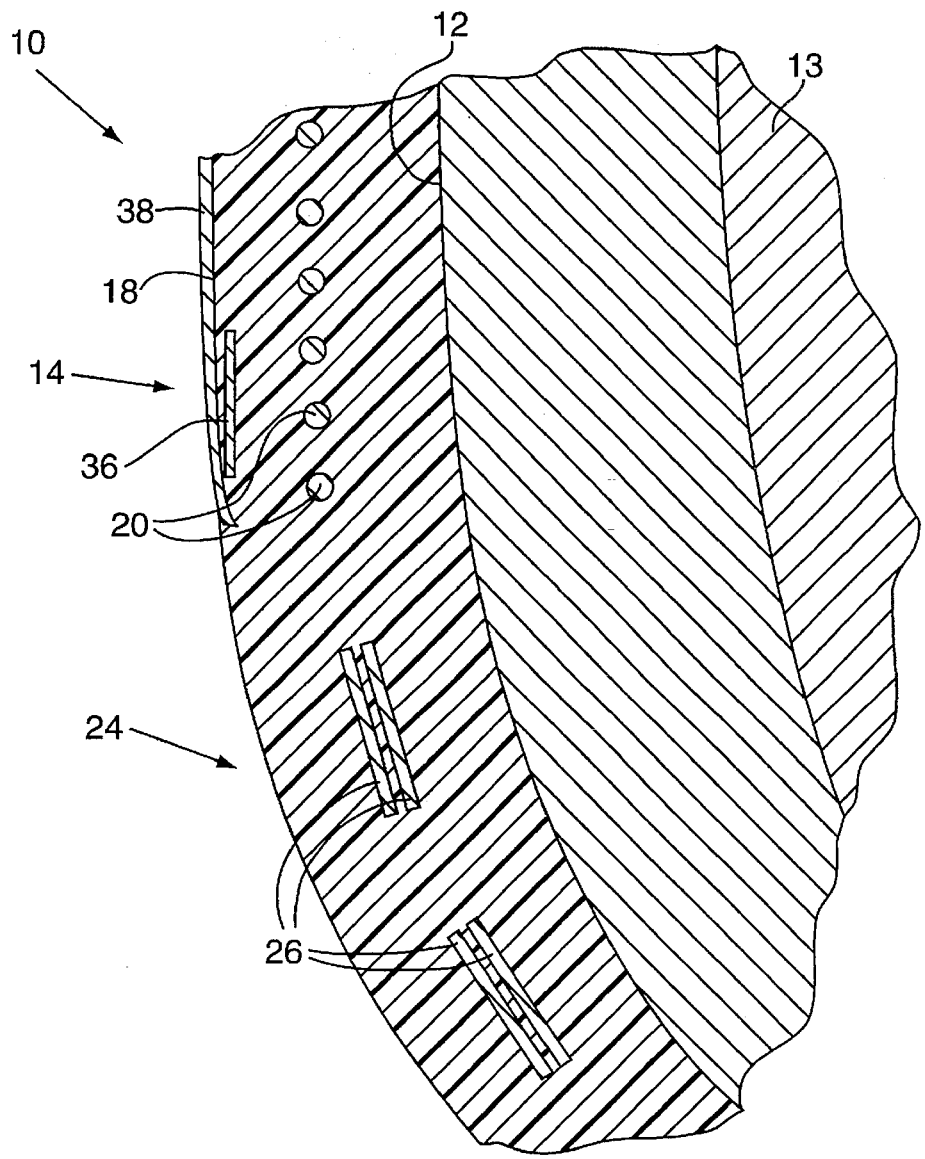
FIG. 3 is a further enlarged schematic partial cross-sectional view of the blanket of FIG. 1 taken between the lines B and C.

With reference to FIG. 1, a hybrid electro-expulsive de-icing system (hybrid EEDS) blanket embodying the features of the present invention is indicated generally by the reference number 10. FIG. 1 is a schematic partial cross-sectional view of the blanket 10 as applied to a leading edge 12 of an airfoil 13. The leading edge is that portion of the airfoil which is exposed to an airflow when not covered by a blanket. The blanket is mounted on the leading edge in order to protect the leading edge from the accumulation of ice particles and from the effects of rain erosion. The line labeled C shows the direction of airflow impinging on the airfoil when in motion. Furthermore, a plane extending perpendicular to the plane of the figure and through the line C intersects the airfoil roughly along its stagnation line which is defined as the line extending along the leading edge of the airfoil where impinging air neither flows above nor below the airfoil.

FIG. 2 is an enlarged schematic partial cross-sectional view of the blanket and airfoil of FIG. 1 taken between the lines A and B. The blanket comprises a center elongated portion or parting strip 14 to be mounted, as shown in FIGS. 1 and 2, on the leading edge of the airfoil at a forwardmost portion 16 with respect to airfoil motion. The length of the center elongated portion extends along the length of the airfoil in a direction perpendicular to the plane of the figure. The center portion supports a heater for maintaining an exposed surface 18 of the center portion above the freezing temperature of water, the purpose of which will be explained more fully below. The heater preferably comprises resistance wire 20, but may also comprise other equivalent heater materials such as etched foils or conductive fibers. The exposed surface is to face outwardly from the forwardmost portion of the leading edge of the airfoil. The width W of the center portion or parting strip extends in a direction from the top to the bottom of the airfoil as shown in FIG. 2, and the parting strip terminates in the widthwise direction at first and second opposed ends 19 and 21.

The blanket further comprises first and second side elongated portions 22 and 24, the length of each side portion being substantially coextensive with the length of the center portion. Each side portion flanks the center elongated portion 14, and each side portion supports conventional EEDS conductors 26, 26. Preferably the first and second side portions are attached to the center portion respectively at the first and second opposed ends 19 and 21. However, the first and second side portions may be physically separate units to be placed alongside the center portion. The first and second side portions respectively define first and second accreting surfaces 32 and 34 to each face outwardly from the leading edge of the airfoil. The accreting surfaces are where ice accumulates and is removed by energizing the associated EEDS supported in the side portions.

FIG. 3 is a further enlarged schematic partial cross-sectional view of the blanket and airfoil of FIG. 1 taken between the lines B and C. The center portion preferably supports a sensor 36 electrically coupled to the heater for determining the temperature of the exposed surface and for regulating the heater in order to maintain the exposed surface above the freezing temperature of water so that water contacting the exposed surface does not freeze thereon. As can be seen in FIGS. 1 and 2, the first and second accreting surfaces of the blanket are operatively located on the airfoil rearwardly of the exposed surface of the blanket relative to airfoil motion so that contact water impinging on the moving airfoil when in motion will be forced by the airflow to "run back" or flow rearwardly from the exposed surface to the accreting surfaces of the blanket.

The sensor maintains the temperature of the exposed surface slightly above the freezing temperature of water, such as from about 3° C. to about 7° C., preferably from about 1° C. to about 3° C., in order to minimize the distance the contact water runs back before it freezes on the accreting surfaces. Minimizing run-back distance prevents the contact water from flowing rearwardly beyond the accreting surface and freezing directly on an uncovered surface of the airfoil where the ice cannot be removed by the blanket.

The width W of the center portion of the parting strip is partly determined by the detailed shape of the airfoil and the location of the stagnation line along the leading edge of the airfoil. The width W is made as small as is practicable in order to minimize aircraft power requirements, yet is made large enough in order to prevent contact water from freezing on the exposed surface. Preferably, the parting strip is from about 5% to 10% as wide as the total width of the blanket extending from the upper edge of the airfoil to its lower edge. For example, the center portion of a blanket might have a width W of from about 0.5" to about 1" for a blanket having a total width, including the center and side portions, of about 10".

Because the exposed surface covers the forwardmost portion of the leading edge of the airfoil, the exposed surface is that portion of the blanket most susceptible to the effects of atmospheric erosion. Thus, preventing ice from accumulating on the exposed surface contributes to a longer operating life in relation to conventional EEDS blankets.

To further lengthen the operating life of the blanket, a layer of material that is relatively impervious to atmospheric weathering or rain erosion, such as a hard plastic or hard metal, may be provided for covering and protecting the exposed surface of the blanket. Preferably the impervious material is a stainless steel strip 38, as shown in FIG. 3, acting as a leading edge cap which is bonded to an elastomer or like material used with EEDS blankets. Furthermore, because it is highly difficult to provide a very smooth surface using conventional EEDS blanket material, preferably the stainless steel strip 38 or other hard material is highly polished to further reduce air-drag. When using a sensor in combination with an impervious material used as an edge cap, the sensor should preferably be located between the heater and the impervious material, as shown in FIG. 3, and preferably as close to the impervious material as practicable for accurately measuring the temperature of the exposed surface and maintaining the exposed surface slightly above the freezing temperature of water.

Figure 4:
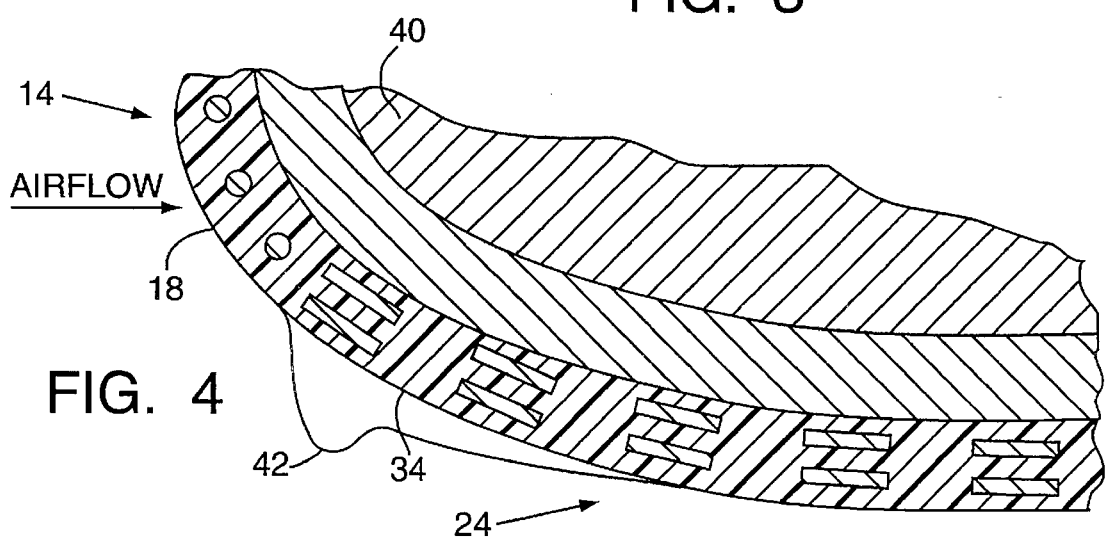
FIG. 4 is a schematic partial cross-sectional view of an airfoil showing run-back ice formed thereon in accordance with a feature of the present invention.

FIG. 4 is a schematic partial cross-sectional view of the EEDS blanket 10 of the present invention applied to an airfoil 40 having run-back ice that has flowed rearwardly from the exposed surface 18 of the center portion 14 of the blanket and has frozen in the form of a ridge 42 at the accreting surface 34 of the side portion 24 of the blanket. An advantageous property of the ridge of ice formed by the EEDS blanket of the present invention is that of superior strength and cohesion. The result is that when the EEDS is energized, the ridge of ice is removed with energy efficiency and with relatively little residue. As such, the cleaner resulting surface after ice-removal contributes to low air-drag in icing conditions.

As will be recognized by those of ordinary skill in the pertinent art, numerous modifications and substitutions may be made to the above-described embodiment of the present invention without departing from the spirit and scope of the appended claims. Accordingly, the preceding portion of this specification is to be taken in an illustrative, as opposed to a limiting sense.

What is claimed is:

1. A de-icing apparatus for use on moving surfaces such as airfoils and the like, comprising:

a center portion whose length is to extend along the length of the leading edge of an airfoil at a forwardmost portion with respect to airfoil motion, and whose width is to extend along the leading edge in a direction from the top to the bottom of the airfoil, the width of the center portion terminating at opposed first and second ends, the center portion defining an exposed surface to face outwardly from a mounting surface of the airfoil, and the center portion including a heater for maintaining the temperature of the exposed surface above the freezing temperature of water; and first and second side portions flanking the center portion respectively at the first and second ends, the length of each side portion being substantially coextensive with the length of the center portion, and each of the side portions to be operatively located rearwardly on a mounting surface of the airfoil relative to the center portion, the side portions each comprising:

an accreting surface to face outwardly from the mounting surface; and an electro-expulsive de-icing system (EEDS) supported by the side portion for shattering and removing ice and other like particles from the accreting surface;

the heater of the center portion preventing water contacting the exposed surface from freezing thereon such that an airflow impinging on the airfoil when in motion forces the contact water to flow rearwardly from the exposed surface of the center portion to the accreting surfaces of the side portions where the water freezes in order to be shattered and removed from the accreting surfaces by EEDS of each side portion.

2. A de-icing apparatus as defined in claim 1, further including a temperature sensor electrically coupled to the heater for regulating the heater in order to maintain the temperature of the exposed surface above the freezing temperature of water so that water contacting the exposed surface does not freeze thereon.

3. A de-icing apparatus as defined in claim 2, wherein the temperature sensor maintains the temperature of the exposed surface slightly above the freezing temperature of water such that when the apparatus is used with an airfoil in motion, an airflow impinging on the airfoil forces water contacting the exposed surface to flow rearwardly from the exposed surface and to freeze on the accreting surfaces.

4. A de-icing apparatus as defined in claim 3, wherein the temperature sensor maintains the exposed surface from about 3° C. to about 7° C.

5. A de-icing apparatus as defined in claim 3, wherein the temperature sensor maintains the exposed surface from about 1° C. to about 3° C.

6. A de-icing apparatus as defined in claim 2, wherein the sensor is located proximately to the exposed surface to accurately determine the temperature of the exposed surface.

7. A de-icing apparatus as defined in claim 2, further including a substantially impervious material covering the exposed surface in order to protect the blanket from the effects of atmospheric weathering.

8. A de-icing apparatus as defined in claim 7, wherein the substantially impervious material is stainless steel.

9. A de-icing apparatus as defined in 8, wherein the surface of the stainless steel is polished for reducing air-drag.

10. A de-icing apparatus as defined in claim 7, wherein the sensor is located proximately to the substantially impervious material for accurately measuring the temperature thereat.

11. A de-icing apparatus as defined in claim 1, wherein the heater comprises resistance wire.

12. A de-icing apparatus for use on moving surfaces such as airfoils and the like, comprising:

a center portion whose length is to extend along the length of the leading edge of an airfoil at a forwardmost portion with respect to airfoil motion, and whose width is to extend along the leading edge in a direction from the top to the bottom of the airfoil, the width of the center portion terminating at opposed first and second ends, the center portion defining an exposed surface to face outwardly from a mounting surface of the airfoil, and the center portion including a heater for maintaining the temperature of the exposed surface above the freezing temperature of water;

first and second side portions flanking the center portion respectively at the first and second ends, the length of each side portion being substantially coextensive with the length of the center portion, and each of the side portions to be operatively located rearwardly on a mounting surface of the airfoil relative to the center portion, the side portions each comprising:
an accreting surface to face outwardly from the mounting surface; and
an electro-expulsive de-icing system (EEDS) supported by the side portion for shattering and removing ice and other like particles from the accreting surface;

the heater of the center portion preventing water contacting the exposed surface from freezing thereon such that an airflow impinging on the airfoil when in motion forces the contact water to flow rearwardly from the exposed surface of the center portion to the accreting surfaces of the side portions where the water freezes in order to be shattered and removed from the accreting surfaces by the EEDS of each side portion;

a temperature sensor electrically coupled to the heater for regulating the heater in order to maintain the temperature of the exposed surface above the freezing temperature of water so that water contacting the exposed surface does not freeze thereon; and a substantially impervious material covering the exposed surface in order to protect the blanket from the effects of atmospheric weathering.

13. A method of removing ice from an accreting surface of a moving object such as an airfoil, comprising the following steps:

heating a forwardmost exposed surface of a moving object to maintain the temperature of the exposed surface above the freezing temperature of water to prevent water contacting the exposed surface from freezing thereon, an airflow impinging on the exposed surface forcing the contact water flows to flow rearwardly onto and to freeze on an unheated accreting surface overlying the moving object; and removing ice from the accreting surface.

14. A method as defined in claim 13, wherein the step of removing is accomplished by an electro-expulsive de-icing system.

15. A method as defined in claim 13, wherein the step of heating includes sensing the temperature of the exposed surface for controlling the heating step in order to maintain the temperature of the exposed surface above the freezing temperature of water.

16. A method as defined in claim 15, wherein the sensing step controls the heater for maintaining the temperature of the exposed surface from about 3° C. to about 7° C.

17. A method as defined in claim 15, wherein the sensing step controls the heater for maintaining the temperature of the exposed surface from about 1° C. to about 3° C.

18. A method as defined in claim 13, further including the step of providing a substantially impervious material to protect a moving object from the effects or atmospheric weathering.

19. A method as defined in claim 18, wherein the substantially impervious material in the step of providing is a polished stainless steel.

* * * * *